(12) United States Patent
Tan et al.

(10) Patent No.: US 6,831,490 B1
(45) Date of Patent: Dec. 14, 2004

(54) CLOCK SYNCHRONIZATION CIRCUIT AND METHOD

(75) Inventors: Khaim Yong Tan, Singapore (SG); Thiam Wah Loh, Singapore (SG); Teck Chye Allen Lim, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 613 days.

(21) Appl. No.: 09/618,405

(22) Filed: Jul. 18, 2000

(51) Int. Cl.[7] .............................. H03L 7/00; H03L 7/06
(52) U.S. Cl. ....................................... 327/153; 327/161
(58) Field of Search .................................. 327/141, 144, 327/149, 150, 152, 153, 156, 158, 159, 161

(56) References Cited

U.S. PATENT DOCUMENTS

| | | | | |
|---|---|---|---|---|
| 5,118,975 A | * | 6/1992 | Hillis et al. ................. | 327/158 |
| 5,552,727 A | * | 9/1996 | Nakao ......................... | 327/159 |
| 5,638,410 A | * | 6/1997 | Kuddes ....................... | 375/357 |
| 5,645,519 A | * | 7/1997 | Lee et al. ................... | 600/114 |
| 6,346,839 B1 | * | 2/2002 | Mnich ......................... | 327/158 |

OTHER PUBLICATIONS

US2001/0043102, "Internal clock signal generating circuit permitting rapid phase lock", Kuge Nov. 22, 2001.*

* cited by examiner

Primary Examiner—Tuan T. Lam (57) ABSTRACT

A clock synchronization circuit for generating an output clock signal that is in synchronization with a reference clock signal and a method embodying the principle of operation of the circuit are disclosed. The circuit has a programmable delay element and a phase detector. Synchronization is reached when the phase difference between the two clock signals is less than a predetermined value. The programmable delay element is coupled to the reference clock signal for introducing an adjustable delay in the reference clock signal to produce the output clock signal. By increasing the adjustable delay, the output clock signal becomes increasingly closer to being in synchronization with the reference clock signal. The phase detector is coupled to the reference clock signal and the output clock signal for detecting the phase difference between the two clock signals. The adjustable delay is increased until synchronization is obtained.

13 Claims, 5 Drawing Sheets

CLOCK SYNCHRONIZATION CIRCUIT AND METHOD

FIELD OF INVENTION

This invention relates to a clock signal synchronization circuit and method. More particularly, this invention relates to a low-cost clock synchronization circuit that can be implemented using elements in a standard programmable gate-array (PGA).

BACKGROUND

In digital circuits such as microprocessor circuits, a reference clock signal is distributed throughout the circuits so as to control timing of events within the circuits. In each circuit, the reference clock signal is typically distributed from a single distribution point to various destination points within the circuit. These destination points are at the clock-input pins of integrated circuits (IC's) that receive the reference clock signal. The destination points may be located at different distances from the distribution point. For reasons which will be discussed later, the signals do not arrive at all these destination points at exactly the same time. The difference in time between the arrivals of the signals is called skew.

Typical paths for a clock signal will include fanout gates, circuit board traces and IC interconnect metal. Each of these provides an opportunity for introducing undesired clock skew. The amount of time it takes a signal to travel along a circuit board trace is called the electrical length of the trace. This electrical length depends upon the physical length and the capacitance of the trace. All else being equal, a signal will take longer to travel a long path than a short one. If the physical lengths of all the clock signal paths are not equal, skew is introduced.

Clock signal paths will often include several levels of fanout gates and buffering. If there are unequal numbers of gates in the signal paths or if there are variations in the time it takes a signal to pass through a gate, skew will occur. How long a signal takes to pass through a gate depends upon several factors, including the propagation delay characteristics of the particular type of gate, the number of loads the gate is driving, and the temperature of the gate. Any variation of these factors between two signal paths will cause skew in the signals. Even if these factors are identical, there may be variations between individual gates of the same type.

There are several reasons for attempting to eliminate as much skew as possible in a circuit. First, skew limits the speed at which a system can operate. Within a microprocessor circuit, tasks are often performed serially, with data being passed from one stage of the circuit to another on subsequent clock cycles. The time period of the clock must be long enough to account for the time it takes a stage to process the data and propagate it to the next stage. In addition, the clock period must also allow for any skew between the clock signals at the various stages. For example, if one stage is clocked late due to clock skew but the next stage is clocked on time, the data from the first stage may not yet be present when the second stage is clocked. The clock period thus must be stretched to accommodate not only the time needed for the first stage to process and propagate the data, but also for the amount of skew between the clock signals present at the two stages.

There are several techniques used in the attempt to reduce clock skew due to one or more of the conditions discussed above. A designer can attempt to equalize the circuit board trace lengths between the clock source and all destinations. This technique is often accomplished by distributing the clock signals radially from a distribution point physically located near the center of the circuit board. The designer can also equalize the number of gates and types of gates in all clock signal paths. Clock skew can also be reduced by equalizing the amount of load that gates and various signal paths must drive. Since these techniques affect the fundamental architecture of the system, they can only be performed during the design of the system. Such techniques cannot account for design changes or component variations. This equalizing technique may not be possible in all circumstances due to other design constraints of the circuit. Additionally, a previously equalized circuit may require the addition of new circuitry not conceived of during the initial design phase. Previously equalized paths may no longer be equalized after the addition of new circuitry.

There are also delay introduction techniques that can be performed during the manufacture or installation of the system. What is important is the difference in delay between the various signal paths, not the actual amount of delay in any given path. Thus, skew between signals can be compensated for by introducing a specific amount of delay in the faster signal paths so as to match the electrical length of the slowest signal path. Delay line tuning involves connecting a clock signal path through a delay line that provides multiple outputs, each output corresponding to a different delay amount. The output corresponding to the needed delay is selected at the time of installation by reference to other clock signal paths. Delay line tuning is adjustable, so it can skew compensate a circuit even after the addition of new circuitry.

These equalizing and delay introduction techniques are useful for large and complex systems that span several system modules. These methods are overkill for small systems wherein skew is introduced mostly due to excessive loading of a reference clock source. In these systems, commercially available phase-locked loop (PLL) circuits can be used to reduce skew. Although these PLLs are accurate and are capable of driving large loads, they are costly and when included in a design, occupies precious printed circuit board space. These PLLs also increases the power consumption of the system.

The prior art therefore creates the need for a low-cost clock synchronization circuit and method for producing an output clock signal that is in synchronization with a reference clock signal.

SUMMARY

According to a preferred embodiment of the present invention, a clock synchronization circuit for generating an output clock signal that is substantially in synchronization with a reference clock signal has a programmable delay element and a phase detector. The programmable delay element and the phase detector is preferably implemented using elements in a PGA. The condition of substantial synchronization is reached when the phase difference between the two clock signals is less than a value predetermined during a design stage of the circuit. The programmable delay element is coupled to the reference clock signal for introducing an adjustable delay in the reference clock signal to produce a delay-adjusted delayed output clock signal. By increasing the adjustable delay, the delay-adjusted output clock signal becomes increasingly closer to being in synchronization with the reference clock signal. The phase detector is coupled to the reference clock signal and the delay-adjusted delayed output clock signal for detecting the phase difference between the two clock signals. The adjustable delay is increased until the synchronization condition is reached.

According to another aspect of the invention, a method for generating a delayed output clock signal that is in synchronization with a reference clock signal involves inverting and delaying the reference clock signal by a first delay to produce an intermediate clock signal. This intermediate clock signal cooperates with the reference clock signal to provide a window of width equal to the predetermined delay. The method next introduces an adjustable delay in the intermediate clock signal to produce a delay-adjusted delayed output clock signal. The method also inverts and delays the delay-adjusted delayed output clock signal by a second predetermined delay Y to produce a reference clock signal delayed by the first delay and the second predetermined delay Y. The method increases the adjustable delay to bring a cycle of the delay-adjusted delayed output clock signal to be increasingly in synchronization with a subsequent cycle of the reference clock signal. The adjustable delay is increased until a mark of the reference clock signal delayed by the first delay and the second predetermined delay Y appears in the window. When such a condition is reached, the delay-adjusted delayed output clock signal leads the reference clock signal by a known phase difference X that is equal to the second predetermined delay Y.

BRIEF DESCRIPTION OF DRAWINGS

The invention will be better understood with reference to the drawings, in which.

DETAILED DESCRIPTION OF THE PREFERRED EMBODIMENT

Figure 1:
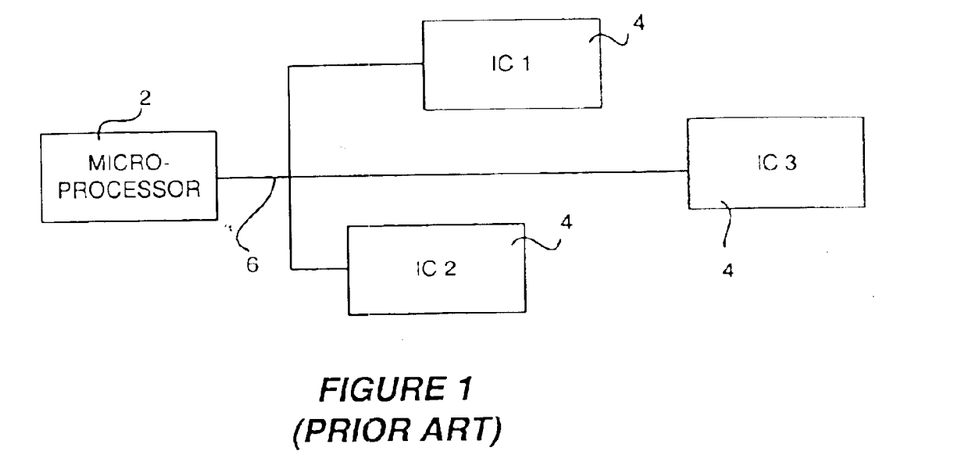
FIG. 1 is a block diagram showing clock destinations at various distances from a microprocessor clock source.
Figure 2:
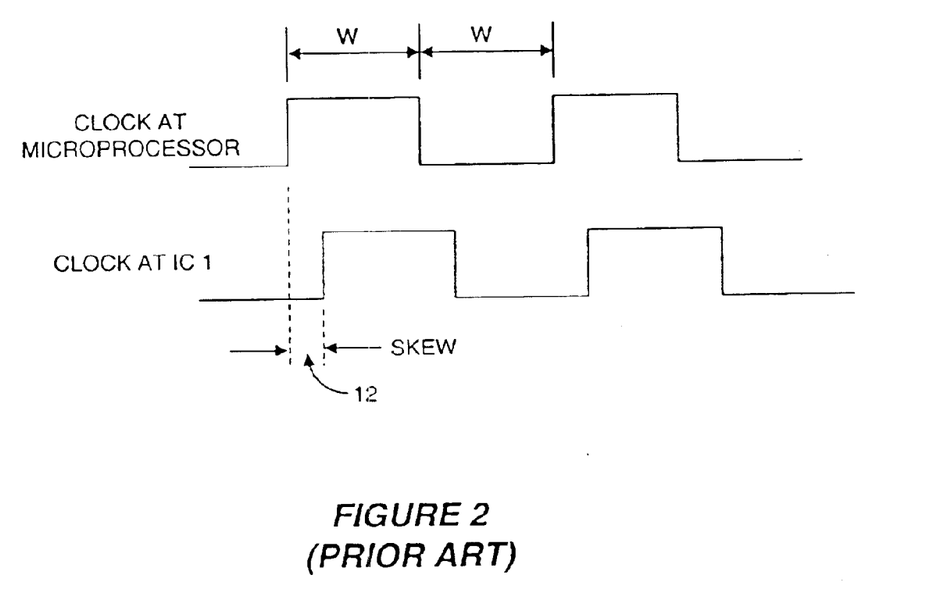
FIG. 2 is a timing diagram showing clock skew between signals at a reference clock and a destination point.

FIG. 1 is a block diagram showing a clock generator, such as a microprocessor 2 supplying a reference clock signal to three destination integrated circuits (IC's) 4. The connections 6 that carry the reference clock signal between the microprocessor 2 and the destination IC's 4 are shown to be of different lengths. FIG. 2 is a timing diagram showing the relationship between the reference clock signals at the microprocessor 2 and one of the destination IC's 4. The reference clock signal is a periodic waveform having a period 2W. The waveform of the reference clock signal arriving at any one of the IC's 4 is shown to have a skew 12 that is caused mainly by overloading the clock source in the microprocessor 2. In this example, the signals do not arrive at the destinations at exactly the same time due to the difference in length of the connections 6. However, the difference in time of arrival is negligible compared to the skew 12 caused by overloading the clock source.

Hereafter a preferred embodiment of the invention is described in the context of components or elements available in a programmable gate array (PGA) such as the UPD65845S1-Y07-2C from NEC. However, it should be recognized that other types of IC's and PGAs could be used to practice the current invention.

Figure 3:
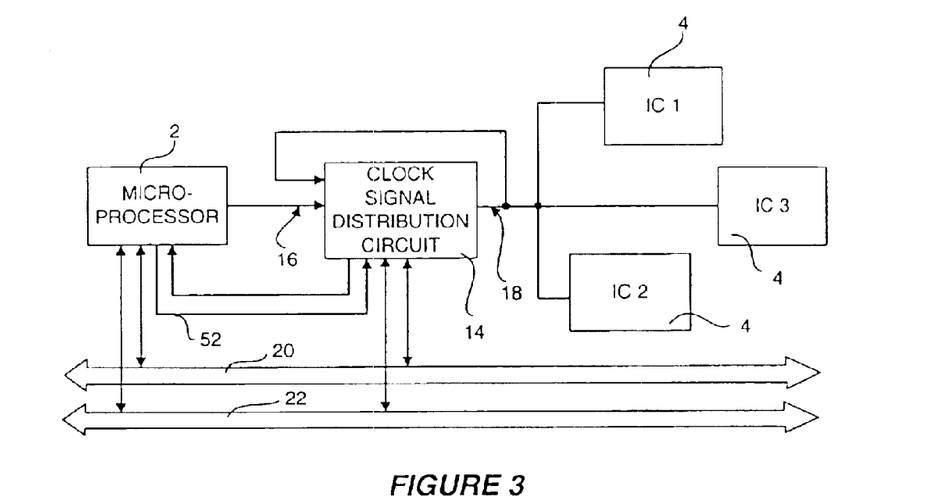
FIG. 3 is a block diagram showing a clock synchronization circuit according to a preferred embodiment of the present invention. The clock synchronization circuit is shown in the context of a typical microprocessor circuit for providing a synchronized clock signal to various ICs in the circuit.

FIG. 3 is a block diagram showing a clock synchronization circuit 14 used in a microprocessor system similar to that shown in FIG. 1 for reducing skew 12. The clock synchronization circuit 14 has a reference clock signal 16 from a microprocessor 2 as an input to the circuit 14. The clock synchronization circuit 14 introduces an adjustable delay in the reference clock signal 16 to produce a delay-adjusted delayed output clock signal 18. As the adjustable delay is increased, the output clock signal 18 is progressively brought into synchronization with the reference clock signal 16. Such a synchronization of the signals is achieved when a cycle of the reference clock signal 16 is delayed to become synchronized with a subsequent cycle of the reference clock signal 16. In this substantially synchronized state, the two signals 16, 18 have a predetermined phase difference. This phase difference is predetermined by the propagation delay times of elements used in the design of the clock synchronization circuit 14. This predetermined phase difference should be within that tolerable for synchronously clocking the IC's 4 so that data 20 and control 22 signals are exchanged at the correct instances. This phase difference is typically equivalent to a delay of several nanoseconds.

Figure 4:
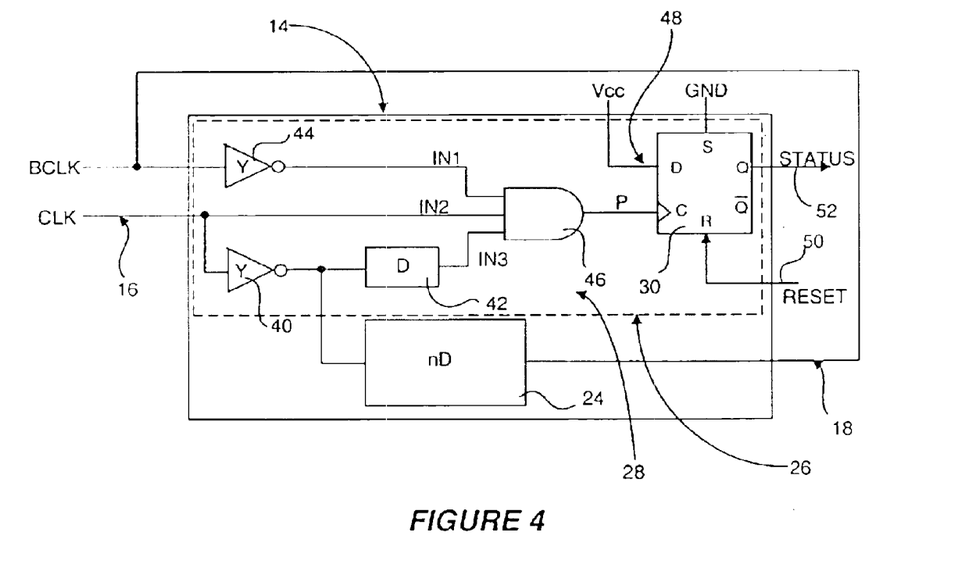
FIG. 4 is a detailed schematic of the clock synchronization circuit in FIG. 3. The clock synchronization circuit has a programmable delay element and a phase detector. The phase detector has a pulse generator and a latch.

Hereafter, the delay-adjusted output clock signal 18 will be referred to as the output clock signal 18 for ease of description. The clock synchronization circuit 14 is next described with the aid of FIG. 4. FIG. 4 is the schematic diagram of a clock synchronization circuit 14 according to the preferred embodiment of the present invention. The circuit 14 has two main blocks, a programmable delay element 24 and a phase detector 26. One of the inputs to the phase detector 26 is the reference clock signal 16. The output clock signal 18 is fed back, preferably through a circuit trace outside of the PGA, into the clock synchronization circuit 14 as a second input to the phase detector 26. Preferably, the phase detector 26 has a pulse generator 28 and a latch, such as a D-latch 30. The output of the pulse generator 28 is a train of pulses that are used to clock the D-latch 30. When the pulse width of a pulse exceeds a pulse width Z that is required to clock the D-latch 30, the D-latch 30 will trigger to indicate the substantially synchronized state of the reference clock signal 16 and the output clock signal 18. If the phase difference between the clock signals 16, 18 is greater than the predetermined phase difference, the programmable delay element 24 is appropriately programmed to increase the adjustable delay in the reference clock signal 16.

The known delays of elements in the PGA allows a designer to design a clock synchronization circuit 14 that produces an output clock signal 18 that has a known phase difference with the reference clock signal 16 when brought into a substantially synchronized state. There are many different types of elements with different delay times in a PGA. These elements make the PGA suitable for implementing the clock synchronization circuit 14. PGAs are commonly used in electronic and microprocessor circuits for reducing the chip count in the circuits. If a PGA is available, the clock synchronization circuit 14 can be implemented without adding more components.

In the clock synchronization circuit 14, the reference clock signal 16, CLK, is electrically coupled to a first NOT gate 40 of the pulse generator 28 to produce an intermediate clock signal. This first NOT gate 40 has a delay of Y. The output of this first NOT gate 40 is electrically coupled to a delay element 42 having a delay of D. The output of the NOT gate 40 is also electrically coupled to the programmable delay element 24. The implementation of such a programmable delay element 24 in a PGA is well known to those skilled in the art. The adjustable delay of this programmable delay element 24 is preferably incremented by D each time it is incremented, where D is the propagation delay of a delay element in the PGA. This programmable delay element 24 is coupled to and controlled by a microprocessor 2 to allow the microprocessor 2 to increment the adjustable delay. The output of the programmable delay element 24 is electrically coupled to the input of a second NOT gate 44 that also preferably has a delay of Y. The output of this second NOT gate 44, the reference clock signal 16 and the output of the delay element 42 are connected to a first, a second and a third input of a three-input AND gate 46 respectively. The output of the AND gate 46 is electrically coupled to the D-latch 30 to clock the D-latch 30. A D-input 48 (data input) of the D-latch is kept at a logic high level by electrically coupling it to a supply voltage, Vcc. An S-input (set input) of the D-latch 30 is electrically coupled to logic low level, GND. An R-input (reset input) of the D-latch 30 is electrically coupled to a reset signal 50 such as one generated by the microprocessor 2. A Q-output of the D-latch 30 is electrically coupled to an input pin of the microprocessor 2 for the microprocessor 2 to read the state of this Q-output.

Figure 5A:
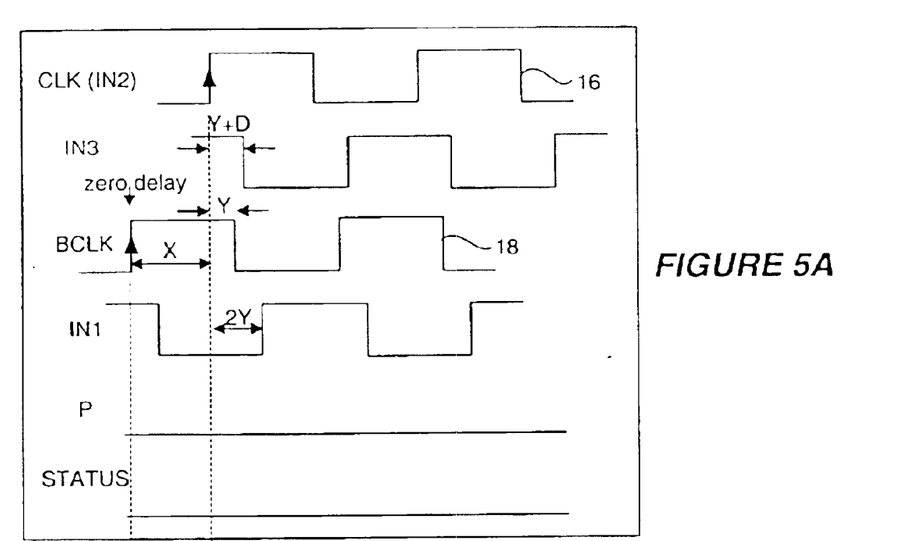
FIG. 5A is a timing diagram showing waveforms at various selected points of the schematic in FIG. 4. This diagram shows a reference clock signal, CLK, and a delay-adjusted delayed output clock signal, BCLK, during power up of the circuit of FIG. 4 when the programmable delay element has zero delay.
Figure 5B:
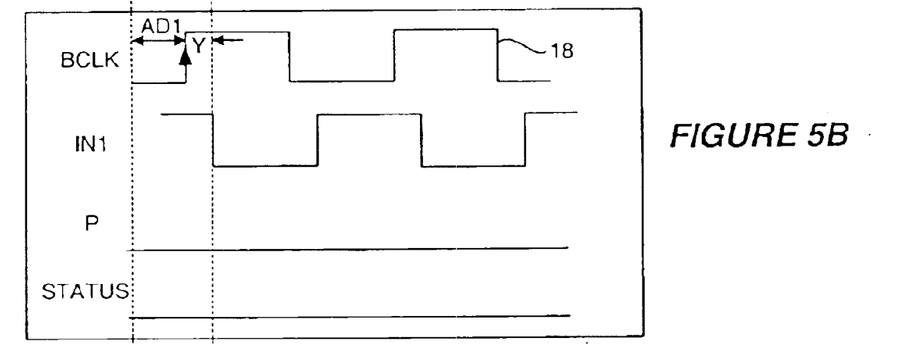
FIG. 5B is a timing diagram similar to FIG. 5A showing the delay-adjusted delayed output clock signal, BCLK, delayed by a delay of AD1 for bringing it closer to being in synchronization with the reference clock signal, CLK.

Next the operation of the clock synchronization circuit 14 is described with the aid of timing diagrams in FIGS. 5A–5F. The reference clock signal 16, CLK, is shown to have a fifty-percent duty. Clock signals of other suitable duty cycles are equally applicable to the present invention. FIG. 5A shows the waveforms of selected signals at various points in the clock synchronization circuit 14 during the powering up of the circuit 14. The adjustable delay of the programmable delay element 24 is set at zero delay. The reference clock signal 16 propagates through the first NOT gate 40 and the delay element 42 to arrive at the third input, IN3, of the AND gate 46 inverted and delayed by Y+D nanoseconds. With the adjustable delay set at zero delay, the input to the second NOT gate 44 is the output clock signal 18, BCLK, which is also the reference clock signal 16, CLK, inverted and delayed by Y. Accordingly, the output of the second NOT gate 44 is the reference clock signal 16 delayed by 2Y as indicated by the waveform IN1 in FIG. 5A. During power up, the microprocessor 2 will perform a synchronization sequence by first resetting the D-latch 30 so that the Q-output of the D-latch 30 is at a logic low level to indicate that synchronization is not reached. At this point, the output of the AND gate, P, is at a logic low level. This logic low level when presented at a C-input (clock input) of the D-latch 30 will not cause any change in the Q-output of the D-latch 30.

To understand the waveforms of the signals in FIGS. 5A–5F, it is worth noting that the reference clock signal 16, CLK, (connected to IN2 of the AND gate 46) and the signal at the third input of the NAND gate, IN3, are in fixed phase relationship with each other. That is, the signal at IN3 is the reference clock signal 16 inverted and delayed by Y+D. The ANDing of the signals at IN2 and IN3 basically opens up a window of width Y+D. Similarly, the BCLK signal 18 and the signal at the first input, IN1, of the AND gate 46 are also in fixed phase relationship with each other. As the adjustable delay of the programmable delay element 24 is increased, the second pair of signals, BCLK and IN1 will shift to the right of FIG. 5A so that the output clock signal 18, BCLK, will progressively become synchronized with the reference clock signal 16, CLK.

In the synchronization sequence, the microprocessor 2 next proceeds to increase the adjustable delay by D. After the adjustable delay is incremented, the microprocessor polls the Q-output of the D-latch 30 for a change in logic state of the Q-output. If there is no change in the Q-output, i.e. it is still at a logic low level, the microprocessor 2 will repeat the above steps of incrementing the adjustable delay and polling the Q-output for a change in state. As the adjustable delay is incremented to a value of AD1, the waveforms of the signals will be that shown in FIG. 5B. At this point, a trailing edge 32 of a mark of a cycle of the signal at IN1 coincides with the edge of the window. If such a condition is detectable, the output clock signal 18, BCLK, is known to lead the reference clock signal 16, CLK, by a phase difference corresponding to the delay Y. However, in this preferred embodiment, such a condition is not detectable at this particular point in time, No pulse appears at the output of the AND gate 46 when at least one of the three inputs of the AND gate 46 is at a logic low level.

Figure 5C:
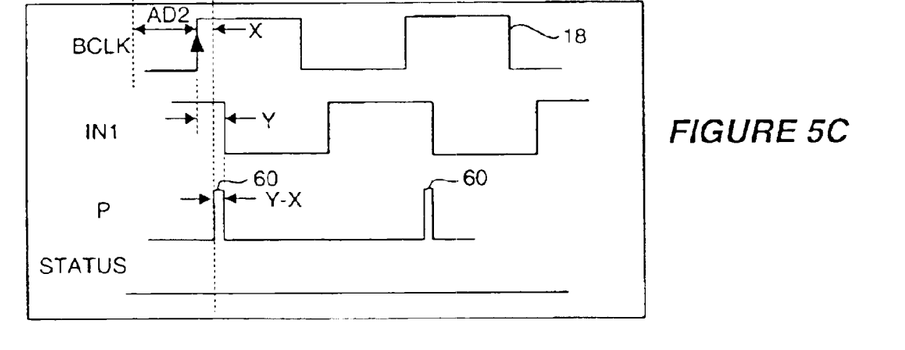
FIG. 5C is a timing diagram showing the delayed-adjusted delayed output clock signal, BCLK, which is delay-adjusted by a delay AD2 to bring it even closer to being in synchronization with the reference clock signal, CLK. A pulse is shown generated by the pulse generator in FIG. 4. The pulse width of the generated pulse is insufficient to trigger the latch in FIG. 3.
Figure 5D:
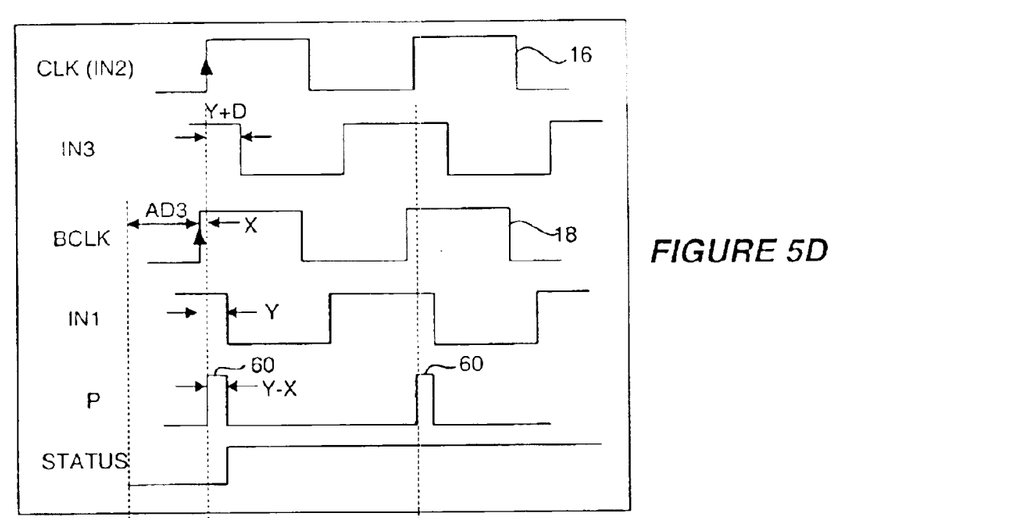
FIG. 5D is a timing diagram showing the delay-adjusted delayed output clock signal, BCLK, which is substantially in synchronization with the reference clock signal, CLK. The pulse width of the generated pulse in FIG. 5C has increased and is sufficiently large to trigger the latch. A signal, STATUS, at the output of the latch is appropriately changed to indicate the synchronization condition.

Beyond this point as the adjustable delay is further incremented to a value of AD2, a pulse 60 begins to appear in the window at the output of the AND gate 46. FIG. 5C shows a pulse generated by the pulse generator 28. The width of this pulse 60 is given by Y-X, where X is the phase difference between the output clock signal 18, BCLK, and the reference clock signal 16, CLK. As long as Y-X is less than a minimum pulse width Z required to clock the D-latch 30 for triggering the D-latch 30, the Q-output will not change state and will remain at a logic low level. As the delay adjustment is further increased to a value of AD3, the phase difference X decreases and the pulse width given by Y-X increases. As soon as Y-X is greater than Z, the D-latch 30 will trigger to cause the Q-output of the D-latch 30 to follow the logic state of the D-input 48 to go to a logic high level. FIG. 5D shows the waveforms of the signals when such a condition is reached. On detecting this condition, the microprocessor 2 recognizes that the reference clock signal 16, CLK, and the output clock signal 18, BCLK, are substantially in synchronization with a phase difference between the two signals of no more 30 than Y-Z. Therefore, with the proper selection of the values of delay Y and pulse width Z, a designer is able to predetermine the phase difference when synchronization occurs.

If Y is larger than Z, the output clock signal 18, BCLK, will lead the reference clock signal 16, CLK, by Y–Z as described above. The worst case phase lead will be given by Ymax–Zmin, where Ymax is the maximum delay of the second NOT gate 44 and Zmin is the minimum pulse width required to clock the D-latch 30.

Figure 5E:
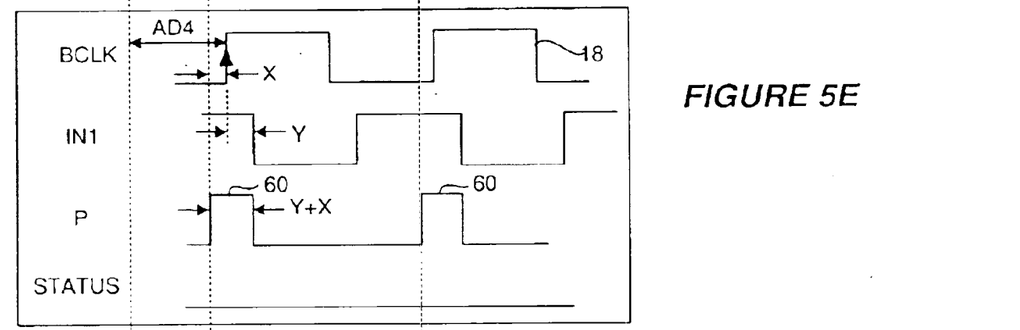
FIG. 5E is a timing diagram similar to FIG. 5D showing that if the adjustable delay is continuously increased, there will come a point in time when the pulse generated is at its maximum width.

Next the condition when both the output clock signal 18, BCLK, and the reference clock signal 16, CLK, are exactly in phase or synchronized but the generated pulse 60 is still of insufficient width to trigger the D-latch 30 is discussed. That is, when X is equal to zero but Y is still less than Z. With further increase in the adjustable delay, the output clock signal 18, BCLK, will begin to lag the reference clock signal 16, CLK. The width of the generated pulse 60 will also increase until it reaches a maximum determined by the window width of Y+D. FIG. 5E shows the waveforms at the various points when the pulse width is at such a maximum of Y+D. This maximum pulse width should trigger the D-latch 30, otherwise the clock synchronization circuit 14 will not work. The phase difference between the two clock signals 16, 18, now given by Y+X, should preferably be greater than Z before the pulse width is allowed to increase to Y+D. Accordingly, Zmax–Ymin gives the worst-case phase lag. The window width given by Y+D should be able to accommodate a pulse of width Zmax. The worst-case phase lead and phase lag define the bounds of the phase difference between the output clock signal 18, BCLK, and the reference clock signal 16, CLK. If the values of Y and Z allows the phase difference to be more accurately determined, the delay of the programmable delay element 24 can be appropriately adjusted to bring the two clock signals closer into synchronization.

After detecting the Q-output signal has changed state to a logic high level, the microprocessor 2 exits the synchronization sequence and proceeds with its normal operation.

Figure 5F:
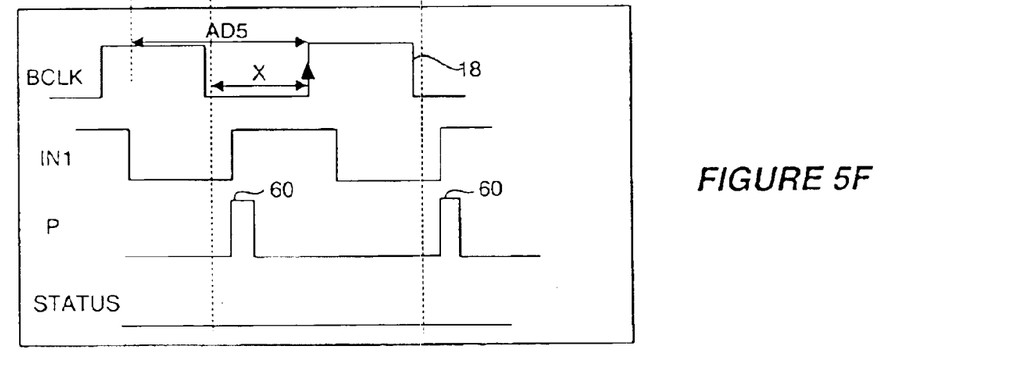
FIG. 5F is a timing diagram showing a diminishing pulse width of the generated pulse with further increase in delay of the reference clock signal, CLK.
Figure 6:
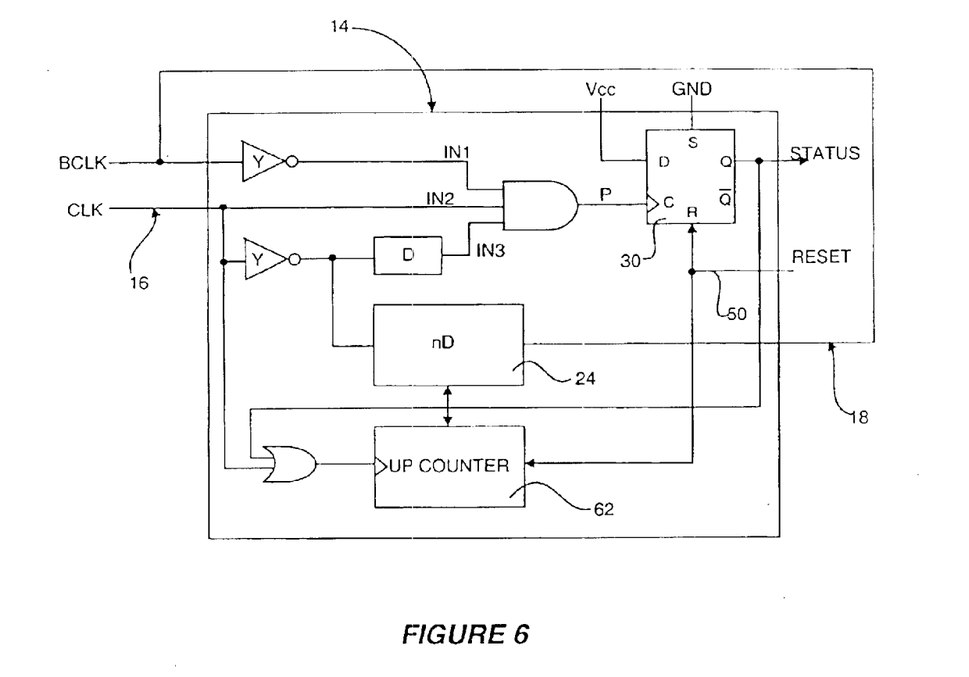
FIG. 6 is a block diagram similar to FIG. 4 showing an alternative embodiment of the present invention.

Although the following condition will not occur if the Y, Z and D values are properly selected, it is worth understanding how the clock synchronization circuit 14 behaves if the adjustable delay is incremented without the D-latch 30 being triggered. FIG. 5F shows a generated pulse whose width is reduced if the adjustable delay is allowed to increase in such a manner. As the adjustable delay is increased, the pair of signals, BCLK and IN1 will shift further to the right, away from the pair of signals, CLK and IN3. The width of the generated pulse will initially remain at its maximum width of Y+D. However, there will come a point when the width of the generated pulse 60 will begin to reduce in width and eventually disappear. Therefore, it is important to select the values of Y, Z and D so that the D-latch 30 is triggered.

The clock synchronization circuit 14 described above demonstrates that a simple low-cost circuit can be used to generate a delayed clock signal 18 that is substantially in synchronization with a reference clock signal 16 from a microprocessor 2.

It should not be construed that the invention is limited to the particular embodiment discussed. The invention can be practiced with other circuits. For example, the programmable delay element 24 may be controlled by an up-counter 62 instead of by the microprocessor 2. FIG. 7 shows such an alternative embodiment. The ORing of the Q-output and the reference clock signal 16, CLK, can be used to clock the up-counter 62. The same reset signal 50 that is used to clear the D-latch 30 in the preferred embodiment can also be used to clear the up-counter 62 at the start of a synchronization sequence. Using such a circuit, no microprocessor intervention is required to increase the adjustable delay. The up-counter 62 will automatically count up with each cycle of the reference clock signal 16, CLK, until the Q-output of the D-latch 30 changes to a logic high level to disable the clocking of the up-counter 62.

We claim:

1. A clock synchronization circuit for generating an output clock signal that is substantially in synchronization with a reference clock signal when in an in-synchronizabon state with a phase difference between the two clock signals of less than a predetermined value, the clock synchronization circuit comprising:

a programmable delay element coupled to the reference clock signal for introducing an adjustable delay in the reference clock signal to produce a delay-adjusted delayed output clock signal that becomes increasingly closer to being in synchronization with the reference clock signal; and a phase detector coupled to the reference clock signal and the delay-adjusted delayed output clock signal for detecting the phase difference between the two clock signals and for generating an in-synchronization signal when the in-synchronization state is reached, the phase detector comprising:

a pulse generator that produces a pulse of variable width when the output clock signal approaches the in-synchronizaton state as the adjustable delay is increased; and a latch that is triggered by the pulse to generate the in-synchronization signal when the width of the pulse reaches a pulse width Z required to trigger the latch.

2. A clock synchronization circuit according to claim 1, wherein the latch is a D-type latch.

3. A clock synchronization circuit according to claim 1, wherein the pulse generator comprises:

means for producing a window of a known width Y that is at least equal to the pulse width Z; and means for generating a signal (IN1) from the delay-adjusted delayed output clock signal whose mark of a cycle is brought to overlap with the window when the adjustable delay is increased to produce the pulse.

4. A clock synchronization circuit according to claim 3, wherein the means for producing the window is a three-input AND gate having a first input coupled to the generated signal (IN1), wherein the generated signal is the reference clock signal delayed substantially by 2Y, a second input coupled to the reference clock signal, and a third input coupled to the reference clock signal that is inverted and delayed by at least Y.

5. A clock synchronization circuit according to claim 4, wherein the in-synchronization state is reached when the pulse width of the pulse generated by the pulse generator reaches a width Y-X that is equal to the pulse width Z; whereby the in-synchronization signal is generated, wherein X is a phase difference between the reference clock signal and the output clock signal.

6. A clock synchronization circuit according to claim 4, wherein the third input of the three-input AND gate is coupled to the reference clock signal that is inverted and delayed by Y+D, whereby D is a delay provided by a delay element.

7. A clock synchronization circuit according to claim 6, wherein the bounds of the phase difference X is given by a worst case phase lead of Ymax−Zmin and a worst case phase lag of Ymin−Zmax depending on the values of Y and Z, wherein Ymax and Ymin are the maximum and minimum delays of a NOT gate respectively; and Zmax and Zmin are the maximum and minimum pulse widths required to trigger the latch respectively.

8. A clock synchronization circuit according to claim 6, wherein the delay-adjusted output clock signal is carried on a trace on a printed circuit board on which the programmable gate array is mounted.

9. A method of generating a delayed output clock signal that is substantially in synchronization with a reference clock signal when the delayed output clock signal has a predetermined phase difference X with the reference clock signal, the method comprising:

inverting and delaying by a first delay the reference clock signal to produce an intermediate clock signal, wherein this intermediate clock signal cooperates with the reference clock signal to provide a window of width equal to the predetermined delay;

introducing an adjustable delay in the intermediate clock signal to produce a delay-adjusted delayed output clock signal;

inverting and delaying by a second predetermined delay Y the delay-adjusted delayed output clock signal to produce the reference clock signal delayed by the first delay and the second predetermined delay Y;

increasing the adjustable delay to bring a cycle of the delay-adjusted delayed output clock signal to be increasingly in synchronization with a subsequent cycle of the reference clock signal until a synchronization condition is reached where a mark of a cycle of the reference clock signal delayed by the first delay and the second predetermined delay Y appears in the window to indicate that the delay-adjusted delayed output clock signal leads the reference clock signal by the phase difference X that is equal to the second predetermined delay Y.

10. A method according to claim 9, wherein increasing the adjustable delay comprises increasing the adjustable delay by a known delay step D each time the adjustable delay is incremented.

11. A method according to claim 10, further comprising increasing the delay by a further number of delay steps corresponding to Y/D to bring the delay adjusted delayed output clock signal to be more in synchronization with the reference clock signal after the synchronization condition is reached.

12. A method according to claim 9, wherein increasing the adjustable delay comprises increasing the adjustable delay until a portion of the mark corresponding to a width of Z appears in the window; whereby the delay-adjusted delayed output clock signal leads the reference clock signal by a phase difference X that is equal to the second predetermined delay Y minus the width Z.

13. A method according to claim 10, wherein Y is smaller than Z and the first delay is greater than Z and wherein increasing the adjustable delay comprises increasing the delay until a portion of the mark corresponding to a width of Z appears in the window; whereby the delay-adjusted delayed output clock signal lags the reference clock signal by a phase difference X that is equal to the width minus the second predetermined delay Y.

* * * * *

UNITED STATES PATENT AND TRADEMARK OFFICE
CERTIFICATE OF CORRECTION

PATENT NO. : 6,831,490 B1
DATED : December 14, 2004
INVENTOR(S) : Khiam Yong Tan et al.

It is certified that error appears in the above-identified patent and that said Letters Patent is hereby corrected as shown below:

<u>Title page,</u>
Item [75], Inventors, "Khaim Yong Tan" should read -- Khiam Yong Tan --.

Signed and Sealed this

Nineteenth Day of April, 2005

JON W. DUDAS
*Director of the United States Patent and Trademark Office*